Aug. 10, 1943.　　　W. L. SMITH　　　2,326,504
CHUTE
Filed July 3, 1941

INVENTOR
WESLEY L. SMITH
BY
Byerly, Watson & Simonds
ATTORNEYS

Patented Aug. 10, 1943

2,326,504

UNITED STATES PATENT OFFICE 2,326,504

CHUTE

Wesley L. Smith, Bedford, Va., assignor to Great American Industries, Inc., New York, N. Y., a corporation of Delaware Application July 3, 1941, Serial No. 401,047

2 Claims. (Cl. 193—32)

This invention relates to chutes and aims to provide an improved chute whose surface is adapted to retard the speeds at which materials flow along the chute.

In accordance with my invention, a chute is provided with an upper surface consisting of a layer of soft, substantially solid rubber containing almost wholly collapsed, closed cells. Such rubber is made by expanding a mass of soft-rubber compound by means of a blowing agent such as sodium bicarbonate or the like under conditions which retain the gases produced by the blowing agent in closed cells within the mass of compound, and then cooling the rubber mass after vulcanization. The cooling has the effect of condensing or otherwise eliminating the gases produced by the blowing agent so that the soft vulcanized rubber collapses substantially to the volume which it had before expansion. In its collapsed form, it has about the same degree of resiliency and the same wearing qualities as solid unexpanded soft rubber. Such collapsed cellular rubber has been made as an intermediate product in making sponge rubber, but it has generally been regarded as of no value in itself.

I have discovered that when the upper wearing surface of a chute is made of a layer of collapsed cellular rubber, it is resilient, strong and durable, and has the property of gripping on smooth surfaces until it is completely worn away, so that the angle of inclination of a chute designed for handling such materials may be increased but the speeds at which the materials flow down through such a chute are controlled to the desired limits. This property is due to the fact that wear on the outer surface of a chute having an upper layer of collapsed cellular rubber opens the collapsed cells at the wearing surface, relieving the vacuum in those cells so that they expand and serve, by a vacuum-cup action, to prevent materials with smooth surfaces from slipping along the chute too rapidly. Thus, although the upper coating of the chute has only the normal resiliency of solid, soft rubber, its outer surface, as wear continues, consists always of a thin layer of expanded rubber pitted with open cells which serve as vacuum cups. To provide the desired upper surface for the coating of the chute when it is new, that surface may be made with molded indentations which provide an initial vacuum-cup action.

A chute embodying my invention is illustrated in the accompanying drawing in which.

Figure 1:
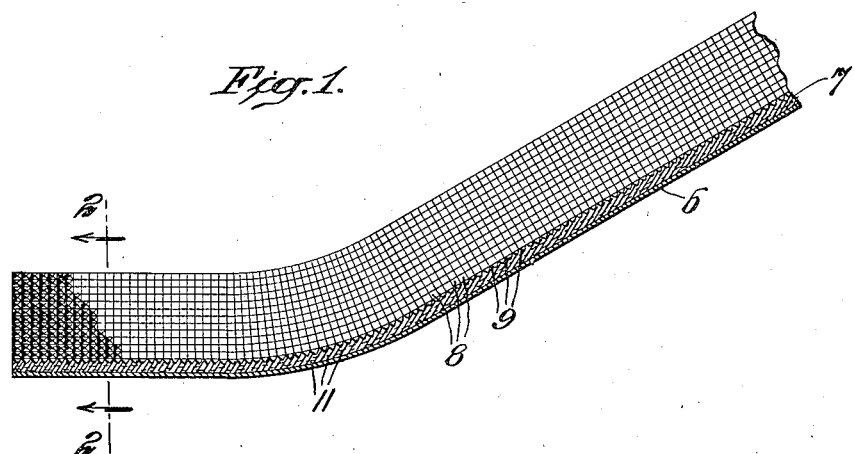
Fig. 1 is a fragmentary section of a chute taken along the line 1—1 of Fig. 2.
Figure 2:
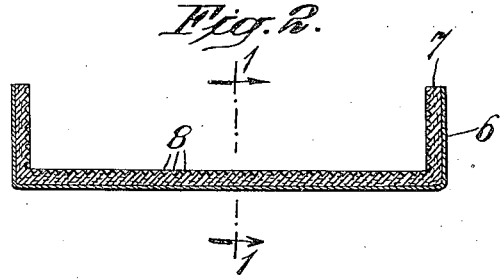
Fig. 2 is a cross section of a chute taken along the line 2—2 in Fig. 1.
Figure 3:
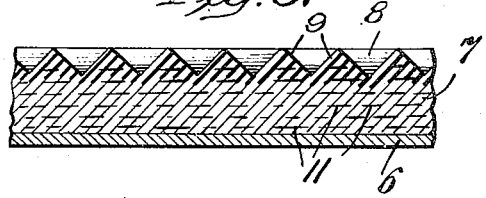
Fig. 3 is an enlarged fragmentary view of the section illustrated in Fig. 2.
Figure 4:
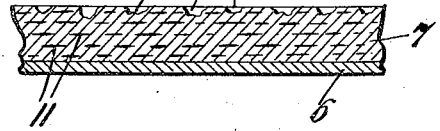
Fig. 4 is a similar section illustrating the upper surface of the chute after wear.

The chute illustrated in the drawing comprises a base 6 of metal, wood, or other strong, rigid material coated with a layer 7 of almost wholly collapsed, closed-cell cellular rubber. When the chute is new, the speed of flow of materials along it is retarded by the vacuum-cup action of the indentations 8 in the tough outer skin 9. After wear, a like effect is occasioned by the vacuum-cup action of the open and expanded cells 10 as shown in Fig. 4. The cells 11 in the body remain collapsed until they are exposed by wear.

The surface coating 7 which has been described may be made by utilizing the first part of the method of making sponge rubber described in United States Letters Patent No. 2,297,018. This method consists in expanding a mass of rubber compound by sodium bicarbonate or a similar blowing agent which is mixed with the compound before vulcanization. During the first part of the vulcanization, the rubber compound is confined in a mold having an internal volume no greater than the volume of the compound. This prevents any substantial evolution of gas within the rubber compound during the first part of the vulcanization and until the rubber compound has acquired consistency and tensile strength sufficient to prevent entrapped gas from rupturing it. During the latter part of the vulcanization, the rubber compound is placed in a larger mold. On release from the first mold, or during the final vulcanization in the larger mold, or at both these times, the mass is expanded by gas produced by the blowing agent, so that, at the end of the vulcanization, there is produced a closed-cell cellular soft rubber article having the shape and size of the second mold.

Since the gas produced from sodium bicarbonate or similar blowing agents is of an unstable character, the gas is condensed or in some way chemically eliminated from the cells when the expanded article is cooled, so that it collapses and returns nearly to the size which the compound had before expansion.

In using this method to make a chute embodying my invention, the mold used in the first part of the vulcanization has a thickness substantially equal to that desired in the coating layer 7. The second mold has a thickness several times as great as that of the first mold, and most desirably has one of its surfaces roughened to mold indentations in one surface of the rubber. The roughened surface of the mold may be a knurled metal surface or a piece of coarse fabric laid in the mold. The roughened surface of the mold has two effects: (1) it molds the indentations in the surface of the rubber and (2) it allows the gas trapped in the cells near the surface to escape, so that a tough, non-cellular outer skin 9 is produced.

The coating layer 7 may be attached with its roughened surface exposed, to the base 6 by one of the cements customarily used for cementing rubber to a surface of metal or of wood or the like. I prefer to use one of the so-called cold curing rubber cements for this purpose. A hot curing cement may be used, but in that case the chute must be enclosed in a mold which will prevent undue expansion during the curing of the cement.

What I claim is:

1. A chute consisting of a rigid base whose upper surface has attached thereto a layer of soft, substantially solid rubber containing almost wholly collapsed closed cells and whose outer surface is pitted with vacuum cups.

2. A chute consisting of a rigid base whose upper surface has attached thereto a layer of soft, substantially solid rubber containing almost wholly collapsed closed cells and having a tough outer skin whose surface is pitted with molded indentations.

WESLEY L. SMITH.